(No Model.)
W. H. & F. C. BURDEN.
COFFEE OR TEA POT STRAINER.
No. 352,516. Patented Nov. 16, 1886.
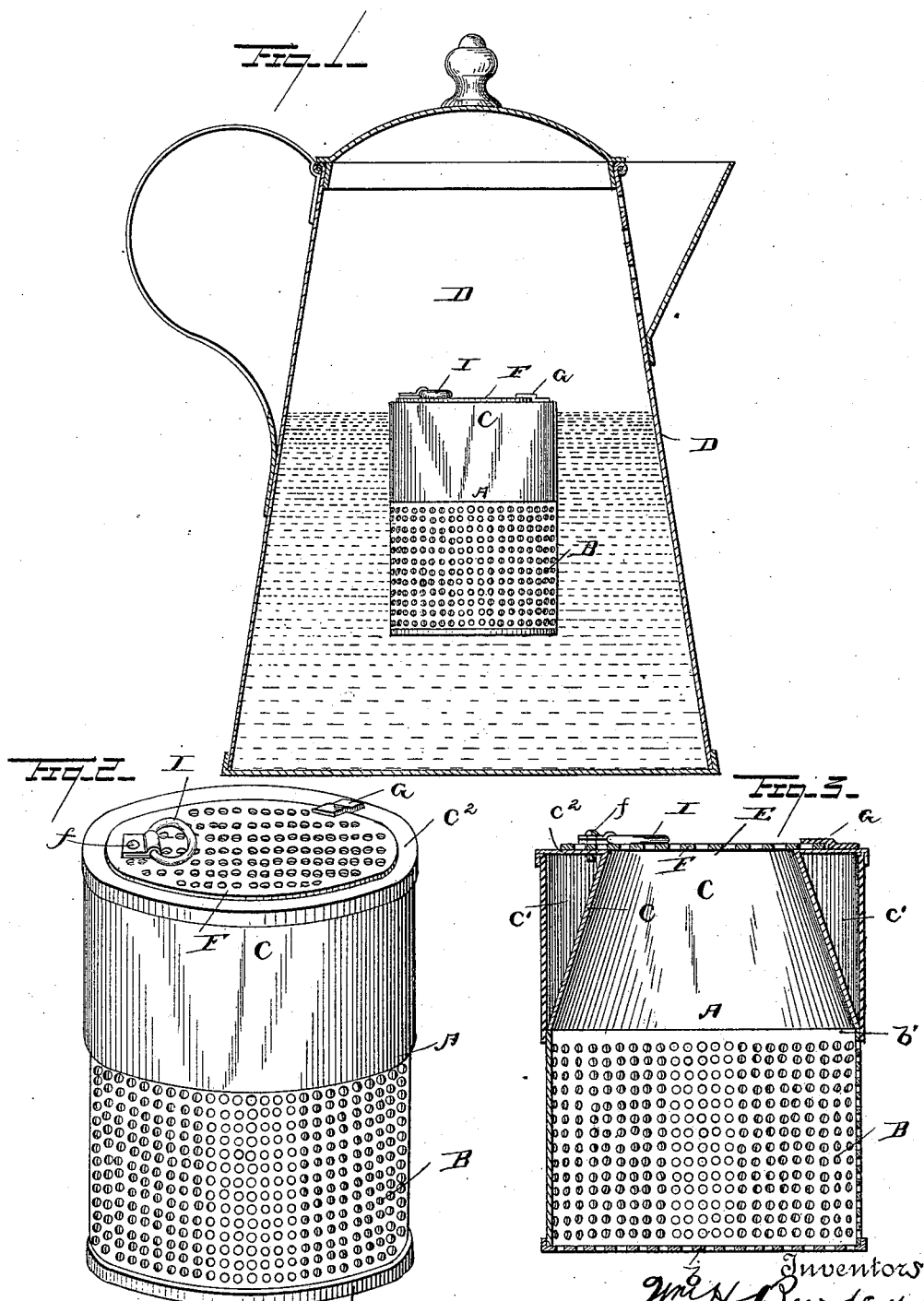

UNITED STATES PATENT OFFICE.

WILLIAM H. BURDEN AND FREDRICK C. BURDEN, OF CLEVELAND, OHIO.

COFFEE OR TEA POT STRAINER.

SPECIFICATION forming part of Letters Patent No. 352,516, dated November 16, 1886.

Application filed April 7, 1886. Serial No. 198,119. (No model.)

*To all whom it may concern:*

Be it known that we, WILLIAM H. BURDEN and FREDRICK C. BURDEN, citizens of the United States, residing at Cleveland, in the county of Cuyahoga and State of Ohio, have invented a new and useful Improvement in Coffee and Tea Pot Strainers, of which the following is a specification, reference being had to the accompanying drawings.

Our invention is an improvement in coffee and tea pot strainers; and it consists of the novel construction and arrangement of the various parts, substantially as hereinafter fully set forth, and specifically pointed out in the claim.

The object of our invention is to provide an improved receptacle having novel features of construction for containing the tea or coffee that is to be placed in a pot for boiling, and which shall float on the water and be thereby held or suspended out of contact with the pot and independently of any fastening or suspending devices. The receptacle is so constructed that the contents thereof can be easily and quickly discharged therefrom after the tea or coffee has been boiled and without danger of the refuse coffee or tea lodging in the receptacle, and it also effectually prevents the escape of fine particles of tea and coffee into the liquid which is to be drunk.

In the drawings hereto annexed, which illustrate a coffee and tea pot strainer embodying our improvements, Figure 1 is a vertical sectional view through a coffee or tea pot, showing our invention in elevation therein. Fig. 2 is a detached perspective view of the strainer. Fig. 3 is a vertical central sectional view thereof.

Referring to the drawings, in which like letters of reference denote corresponding parts in all the figures, A designates our improved strainer for coffee and tea pots, which consists of a receptacle or vessel, B, and a float, C, connected to the upper part of the receptacle, so that the receptacle and its contents are wholly immersed in the water and suspended therein out of contact with the pot D, the latter being of the ordinary or any approved pattern.

The receptacle B is preferably made in the form of a cylinder with a closed end, $b$, and an open end, $b'$, and the cylindrical vessel is made of perforated sheet metal to permit the boiling water in the pot to percolate very freely through the same, and thereby have free access to the contents of the receptacle. If desired, however, the receptacle may be made of other suitable material.

The float C is permanently attached to the upper end of the perforated receptacle, and it comprises a vertical cylindrical shell, $c$, an inner conical shell, $c'$, arranged out of contact with the outer shell, $c$, to form an intermediate space or chamber, and a top, $c^2$, connecting the upper edges of the outer and inner shells, the joints between the shells and cover or top being air-tight, so as to form a hermetically sealed or closed chamber, C', in the float, by which it is rendered sufficiently buoyant to suspend the receptacle B and its contents in the water of the pot. The vertical cylindrical shell $c$ of the float is arranged concentric with the receptacle B, and it is permanently affixed thereto, at its lower edge, by solder or other suitable means, and the conical inner shell, $c'$, is inverted within the outer shell, so that its smaller or contracted end is uppermost, while the edges at the larger end of the said shell are secured by solder or otherwise directly to the outer shell, or to the perforated vessel or receptacle B. The contracted end of the conical shell opens through the upper end of the float, so as to provide a discharge-opening, E, at the middle of the float, through which the contents of the receptacle B can be very conveniently emptied, and when the device is in use, this opening is closed by a cover, F, to prevent the coffee or tea from escaping from the receptacle through the opening in the float. The cover F is pivoted, near one edge, to the float by a suitable pin or shaft, $f$, (shown more clearly in Figs. 2 and 3,) so that it is permanently connected to the float, and this cover can be very easily swung or moved by hand, to expose and conceal the discharge-opening through the float.

A keeper, G, is affixed to the upper side of the float, and in such proximity to the discharge-opening therein that the free edge of the swinging cover F fits beneath the same when it is closed, so that the cover is prevented from accidental displacement to expose the discharge-opening and prevent the contents of the vessel from escaping.

The swinging cover F is made from a single piece of sheet metal, and perforated to permit the boiling water to pass freely through the same.

The float is provided with a suitable finger-piece, I, so that it can be conveniently placed in and removed from the water in the pot. Preferably a ring is connected thereto.

This being the construction of our improved strainer for coffee and tea pots, the operation thereof is as follows: The swinging cover F is first moved or thrown to one side to expose the opening E therein, and the tea, coffee, or other suitable substance is introduced into the receptacle through the said opening and the float, after which the swinging cover is again adjusted, so that its free edge is confined in place by the keeper. The strainer and its contents are now lowered or dropped into the boiling water, and the float prevents the receptacle and its contents from sinking and suspends the receptacle in the water, to wholly immerse the same and its contents therein, so that the water can percolate freely through the receptacle and the coffee or tea therein. The receptacle and float are allowed to remain in the water for a suitable length of time sufficient to enable the coffee to boil, and they are then removed from the pot D, together with the refuse tea or coffee, which has now become useless. To empty the receptacle of its contents, the swinging cover is turned on its pivot or shaft to one side and the vessel is inverted, and the contents of the vessel will be deflected by the inclined sides of the conical shell to and through the discharge-opening, the coffee or tea sliding along the sides of the conical shell very freely and are wholly and effectually discharged therefrom, as there are no protruding surfaces in the receptacle or float against which they can lodge. Water can be forced into and through the receptacle and float to more thoroughly cleanse it.

We are aware that it has been heretofore proposed to provide a floating coffee or tea pot strainer, which consists of a suitable receptacle, a float connected to the upper end thereof, so as to float on the water and immerse the receptacle therein, and a tube passing through the float and communicating with the receptacle, a perforated partition being connected to the receptacle and fitting over the lower end of the tube to provide means whereby water can flow freely through the tube, the receptacle, and the contents of the latter. Our invention differs from this device, from the fact that we provide a float which is attached to the upper end of the receptacle and has an inverted conical inner shell which is attached at its lower edges to the outer cylindrical shell, so that when the device is inverted to empty the vessel or receptacle of its contents the latter will be deflected by the inclined sides of the conical shell to the central discharge-opening. By the peculiar arrangement of the conical shell the contents of the receptacle can be more easily and readily discharged, as no protruding or projecting surfaces are provided against which the tea or coffee can lodge.

Having thus fully described our invention, what we claim as new, and desire to secure by Letters Patent, is—

As a new article of manufacture, a strainer for coffee and tea pots, consisting of a perforated receptacle or vessel, B, and a float connected to the upper end of the vessel and having an outer concentric shell and an inverted conical shell arranged within the outer shell and connected thereto at its lower edge, a swinging cover connected to the float to close the opening E therein, and a keeper for confining the free edge of the cover, substantially as described, for the purpose set forth.

In testimony that we claim the foregoing as our own we have hereto affixed our signatures in presence of two witnesses.

WILLIAM H. BURDEN.
FREDRICK C. BURDEN.

Witnesses:
A. J. BROCKETT,
ABNER SLUTZ.